US012394899B2

(12) United States Patent
Lee et al.

(10) Patent No.: US 12,394,899 B2
(45) Date of Patent: Aug. 19, 2025

(54) ANTENNA STRUCTURE AND MOBILE DEVICE

(71) Applicant: Wistron NeWeb Corp., Hsinchu (TW)

(72) Inventors: Yueh-Chan Lee, Hsinchu (TW); Cheng-Da Yang, Hsinchu (TW); Kuan-Hung Li, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 128 days.

(21) Appl. No.: 18/412,708

(22) Filed: Jan. 15, 2024

(65) Prior Publication Data

US 2024/0291150 A1 Aug. 29, 2024

(30) Foreign Application Priority Data

Feb. 23, 2023 (TW) ................................ 112106584

(51) Int. Cl.
*H01Q 5/40* (2015.01)
*H01Q 1/22* (2006.01)
*H01Q 1/48* (2006.01)

(52) U.S. Cl.
CPC ............ *H01Q 5/40* (2015.01); *H01Q 1/2266* (2013.01); *H01Q 1/48* (2013.01)

(58) Field of Classification Search
CPC ........ H01Q 1/22; H01Q 1/24; H01Q 1/48–52; H01Q 9/42; H01Q 5/30–50
See application file for complete search history.

(56) References Cited

U.S. PATENT DOCUMENTS 10,454,156 B1 10/2019 Yang et al.
10,910,698 B2 * 2/2021 Wei ........................ H01Q 5/357

FOREIGN PATENT DOCUMENTS

TW 202002403 A 1/2020

* cited by examiner

*Primary Examiner* — Hasan Islam
(74) *Attorney, Agent, or Firm* — McClure, Qualey & Rodack, LLP

(57) ABSTRACT

An antenna structure includes a first ground element, a second ground element, a first radiation element, a second radiation element, a third radiation element, a first capacitor, and a second capacitor. The first ground element includes a first edge segment, a first protruding segment, and a second protruding segment. The second ground element includes a second edge segment, a third protruding segment, and a fourth protruding segment. The first capacitor is coupled between the first protruding segment and the third protruding segment. The second capacitor is coupled between the second protruding segment and the fourth protruding segment. The first radiation element has a feeding point. The first radiation element is coupled through the second radiation element to the first edge segment.

20 Claims, 3 Drawing Sheets

ANTENNA STRUCTURE AND MOBILE DEVICE

CROSS REFERENCE TO RELATED APPLICATIONS

This application claims priority of Taiwan Patent Application No. 112106584 filed on Feb. 23, 2023, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna structure.

BRIEF SUMMARY OF THE INVENTION

In an exemplary embodiment, the invention is directed to an antenna structure that includes a first ground element, a second ground element, a first radiation element, a second radiation element, a third radiation element, a first capacitor, and a second capacitor. The first ground element includes a first edge segment, a first protruding segment, and a second protruding segment. The second ground element includes a second edge segment, a third protruding segment, and a fourth protruding segment. The first capacitor is coupled between the first protruding segment and the third protruding segment. The second capacitor is coupled between the second protruding segment and the fourth protruding segment. The first radiation element has a feeding point. The first radiation element is adjacent to the second edge segment. The first radiation element is coupled through the second radiation element to the first edge segment. The third radiation element is coupled to the second edge segment. The third radiation element is adjacent to the second radiation element.

In some embodiments, the antenna structure further includes a metal cavity coupled to the first edge segment and the second edge segment.

In some embodiments, the width of the first protruding segment is greater than the width of the second protruding segment, and the width of the third protruding segment is greater than the width of the fourth protruding segment.

In some embodiments, the capacitance of the first capacitor is from 0.2 pF to 0.7 pF.

In some embodiments, the capacitance of the second capacitor is from 0.2 pF to 0.7 pF.

In some embodiments, the first radiation element substantially has a variable-width N-shape.

In some embodiments, the second radiation element substantially has a variable-width L-shape.

In some embodiments, the second radiation element has a first corner notch and a second corner notch.

In some embodiments, the third radiation element substantially has a straight-line shape.

In some embodiments, the third radiation element at least partially extends into the second corner notch of the second radiation element.

In some embodiments, a first coupling gap is formed between the first radiation element and the second edge segment. The width of the first coupling gap is shorter than or equal to 1 mm.

In some embodiments, a second coupling gap is formed between the third radiation element and the second radiation element. The width of the second coupling gap is shorter than or equal to 0.5 mm.

In some embodiments, a third coupling gap is formed between the second radiation element and the first radiation element. The width of the third coupling gap is from 0.5 mm to 1.5 mm.

In some embodiments, the first radiation element, the second radiation element, and the third radiation element are substantially surrounded by the first ground element and the second ground element.

In some embodiments, the antenna structure covers a first frequency band, a second frequency band, and a third frequency band.

In some embodiments, the first frequency band is from 2400 MHz to 2500 MHZ, the second frequency band is from 5150 MHz to 5850 MHz, and the third frequency band is from 5925 MHz to 7125 MHz.

In some embodiments, the length of the first radiation element is shorter than 0.25 wavelength of the first frequency band.

In some embodiments, the length of the second radiation element is substantially equal to 0.25 wavelength of the third frequency band.

In some embodiments, the metal cavity substantially has a hollow cuboid shape without any cover.

In another exemplary embodiment, the invention is directed to a mobile device that includes a keyboard frame, a base housing, a hinge element, and an antenna structure as mentioned above. The antenna structure is disposed between the keyboard frame and the base housing. The antenna structure is adjacent to the hinge element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
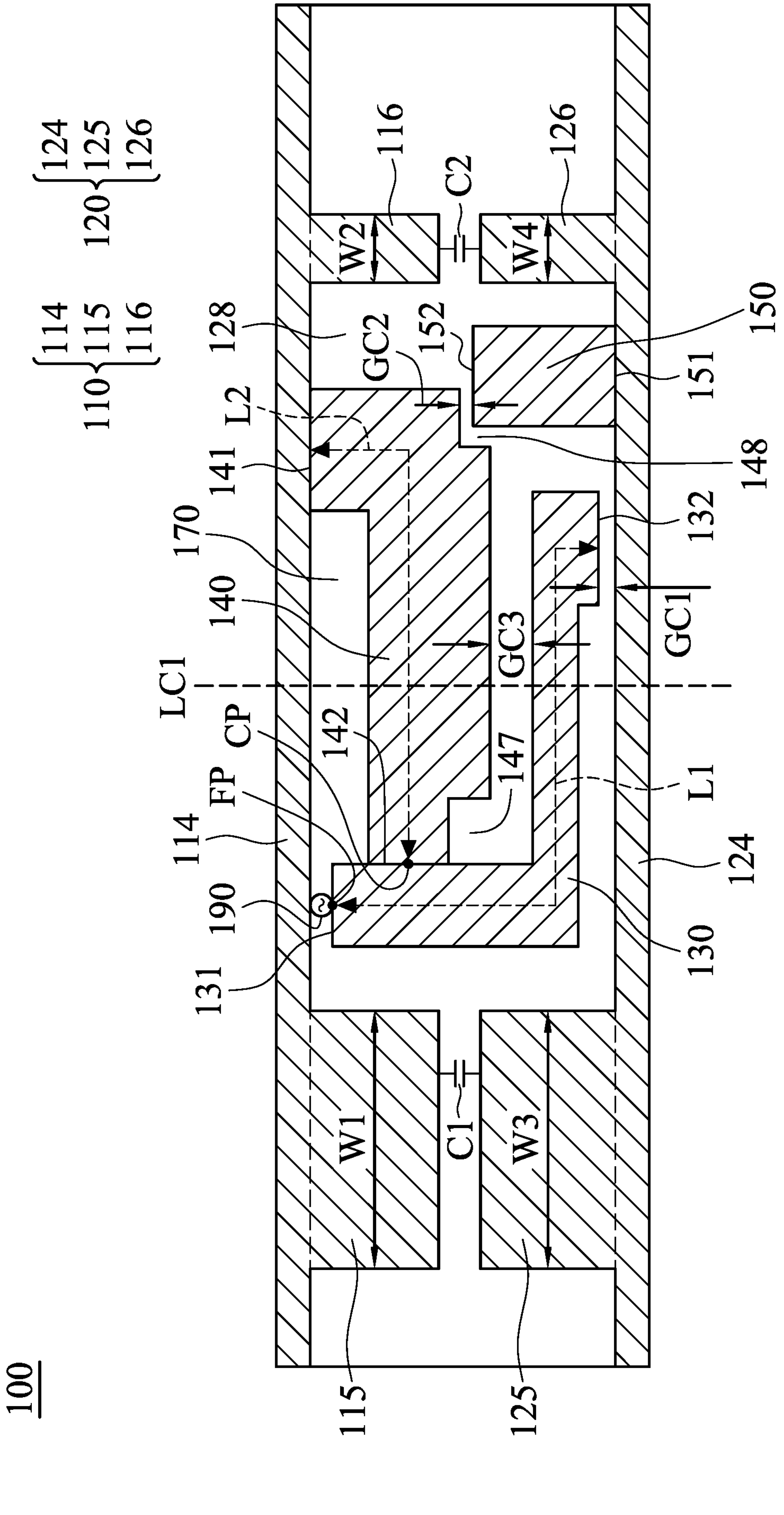
FIG. 1 is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
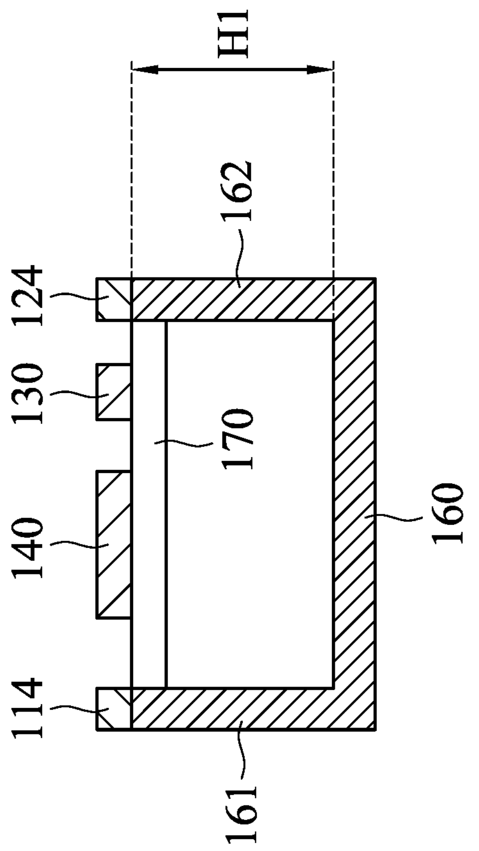
FIG. 2 is a sectional view of an antenna structure according to an embodiment of the invention.

FIG. 1 is a top view of an antenna structure 100 according to an embodiment of the invention. FIG. 2 is a sectional view of the antenna structure 100 according to an embodiment of the invention (along a sectional line LC1 of FIG. 1). Please refer to FIG. 1 and FIG. 2 together. The antenna structure 100 may be applied to a mobile device, such as a smart phone, a tablet computer, or a notebook computer. As shown in FIG. 1 and FIG. 2, the antenna structure 100 includes a first ground element 110, a second ground element 120, a first radiation element 130, a second radiation element 140, a third radiation element 150, a metal cavity 160, a first capacitor C1, and a second capacitor C2. The first ground element 110, the second ground element 120, the first radiation element 130, the second radiation element 140, and the third radiation element 150 may all be made of metal materials, such as copper, silver, aluminum, iron, or their alloys.

The first ground element 110 includes a first edge segment 114, a first protruding segment 115, and a second protruding segment 116. The first edge segment 114 is coupled between the first protruding segment 115 and the second protruding segment 116. For example, the first edge segment 114 may substantially have a straight-line shape, and the width W1 of the first protruding segment 115 may be greater than the width W2 of the second protruding segment 116.

The second ground element 120 includes a second edge segment 124, a third protruding segment 125, and a fourth protruding segment 126. The second edge segment 124 is coupled between the third protruding segment 125 and the fourth protruding segment 126. For example, the second edge segment 124 may substantially have another straight-line shape, which may be substantially parallel to the first edge segment 114 as mentioned above. The width W3 of the third protruding segment 125 may be greater than the width W4 of the fourth protruding segment 126.

The third protruding segment 125 is disposed opposite to the first protruding segment 115. The first capacitor C1 is coupled between the first protruding segment 115 and the third protruding segment 125. Furthermore, the fourth protruding segment 126 is disposed opposite to the second protruding segment 116. The second capacitor C2 is coupled between the second protruding segment 116 and the fourth protruding segment 126.

In some embodiments, a slot region 128 is surrounded by the first edge segment 114, the first protruding segment 115, the second protruding segment 116, the second edge segment 124, the third protruding segment 125, and the fourth protruding segment 126. The first radiation element 130, the second radiation element 140, and the third radiation element 150 are all disposed inside the slot region 128. In other words, the first radiation element 130, the second radiation element 140, and the third radiation element 150 are substantially surrounded by the first ground element 110 and the second ground element 120.

The first radiation element 130 may substantially have a variable-width N-shape. Specifically, the first radiation element 130 has a first end 131 and a second end 132. A feeding point FP is positioned at the first end 131 of the first radiation element 130. The second end 132 of the first radiation element 130 is an open end. The feeding point FP may be further coupled to a signal source 190. For example, the signal source 190 may be an RF (Radio Frequency) module for exciting the antenna structure 100. In some embodiments, the second end 132 of the first radiation element 130 is adjacent to the second edge segment 124. A first coupling gap GC1 may be formed between the first radiation element 130 and the second edge segment 124. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The second radiation element 140 may substantially have a variable-width L-shape. Specifically, the second radiation element 140 has a first end 141 and a second end 142. The first end 141 of the second radiation element 140 is coupled to the first edge segment 114. The second end 142 of the second radiation element 140 is coupled to a connection point CP on the first radiation element 130. For example, the connection point CP may be adjacent to the aforementioned feeding point FP. In other words, the first radiation element 130 is coupled through the second radiation element 140 to the first edge segment 114. In some embodiments, the second radiation element 140 has a first corner notch 147 positioned at the second end 142, and a second corner notch 148 positioned at its bending portion. For example, the first corner notch 147 may substantially have a relatively large rectangular shape, and the second corner notch 148 may substantially have a relatively small rectangular shape, but they are not limited thereto.

The third radiation element 150 may substantially have a straight-line shape. Specifically, the third radiation element 150 has a first end 151 and a second end 152. The first end 151 of the third radiation element 150 is coupled to the second edge segment 124. The second end 152 of the third radiation element 150 is an open end. In some embodiments, the second end 152 of the third radiation element 150 is adjacent to the second radiation element 140. A second coupling gap GC2 may be formed between the third radiation element 150 and the second radiation element 140. In some embodiments, the second end 152 of the third radiation element 150 at least partially extends into the second corner notch 148 of the second radiation element 140. In some embodiments, a third coupling gap GC3 is formed between the second radiation element 140 and the first radiation element 130.

The metal cavity 160 may substantially have a hollow cuboid shape without any cover. Two opposite sidewalls 161 and 162 of the metal cavity 160 are coupled to the first edge segment 114 and the second edge segment 124, respectively. It should be understood that the metal cavity 160 is merely an optional element, which is omitted in other embodiments. In some embodiments, the antenna structure 100 further includes a dielectric substrate 170. The dielectric substrate 170 may be disposed in the metal cavity 160. The first radiation element 130, the second radiation element 140, and the third radiation element 150 may all be disposed on the same surface of the dielectric substrate 170. For example, the dielectric substrate 170 may be an FR4 (Flame Retardant 4) substrate, a PCB (Printed Circuit Board), or an FPC (Flexible Printed Circuit). In some embodiments, the first ground element 110 and the second ground element 120 further extend onto the aforementioned surface of the dielectric substrate 170.

In some embodiments, the antenna structure 100 can operate in a first frequency band, a second frequency band, and a third frequency band. For example, the first frequency band may be from 2400 MHz to 2500 MHz, the second frequency band may be from 5150 MHz to 5850 MHz, and the third frequency band may be from 5925 MHz to 7125 MHz. Accordingly, the antenna structure 100 can support at least the wideband operations of conventional WLAN (Wireless Local Area Network) and next-generation Wi-Fi 6E.

In some embodiments, the operational principles of the antenna structure 100 will be described as follows. The second edge segment 124 can be excited by the first radiation element 130 using a coupling mechanism, so as to generate the first frequency band. Because of the frequency doubling effect, the first radiation element 130 can be independently excited to generate the second frequency band. A loop path can be formed by the second radiation element 140 and the first edge segment 114, and it can be excited to generate the third frequency band. The third radiation element 150 is configured to fine-tune the impedance matching of the second frequency band. According to practical measurements, the first protruding segment 115, the third protruding segment 125, and the first capacitor C1 coupled therebetween can help to increase the operational bandwidth of the third frequency band. The second protruding segment 116, the fourth protruding segment 126, and the second capacitor C2 coupled therebetween can help to increase the operational bandwidth of the first frequency band. In addition, the variable-width design of the second radiation element 140 can help to increase the operational bandwidth of the second frequency band.

In some embodiments, the element sizes and element parameters of the antenna structure 100 will be described as follows. The width W1 of the first protruding segment 115 may be at least twice the width W2 of the second protruding segment 116. For example, the width W1 of the first protruding segment 115 may be from 8 mm to 10 mm, and the width W2 of the second protruding segment 116 may be from 3 mm to 4 mm. The width W3 of the third protruding segment 125 may be at least twice the width W4 of the fourth protruding segment 126. For example, the width W3 of the third protruding segment 125 may be from 8 mm to 10 mm, and the width W4 of the fourth protruding segment 126 may be from 3 mm to 4 mm. The length L1 of the first radiation element 130 may be shorter than 0.25 wavelength (λ/4) of the first frequency band of the antenna structure 100. The length L2 of the second radiation element 140 may be substantially equal to 0.25 wavelength (λ/4) of the third frequency band of the antenna structure 100. The width of the first coupling gap GC1 may be shorter than or equal to 1 mm. The width of the second coupling gap GC2 may be shorter than or equal to 0.5 mm. The width of the third coupling gap GC3 may be from 0.5 mm to 1.5 mm. The capacitance of the first capacitor C1 may be from 0.2 pF to 0.7 pF. The capacitance of the second capacitor C2 may be from 0.2 pF to 0.7 pF. The height H1 of the hollow portion of the metal cavity 160 may be from 4 mm to 8 mm. The above ranges of element sizes and element parameters are calculated and obtained according to many experiment results, and they help to optimize the operational bandwidth and impedance matching of the antenna structure 100.

Figure 3:
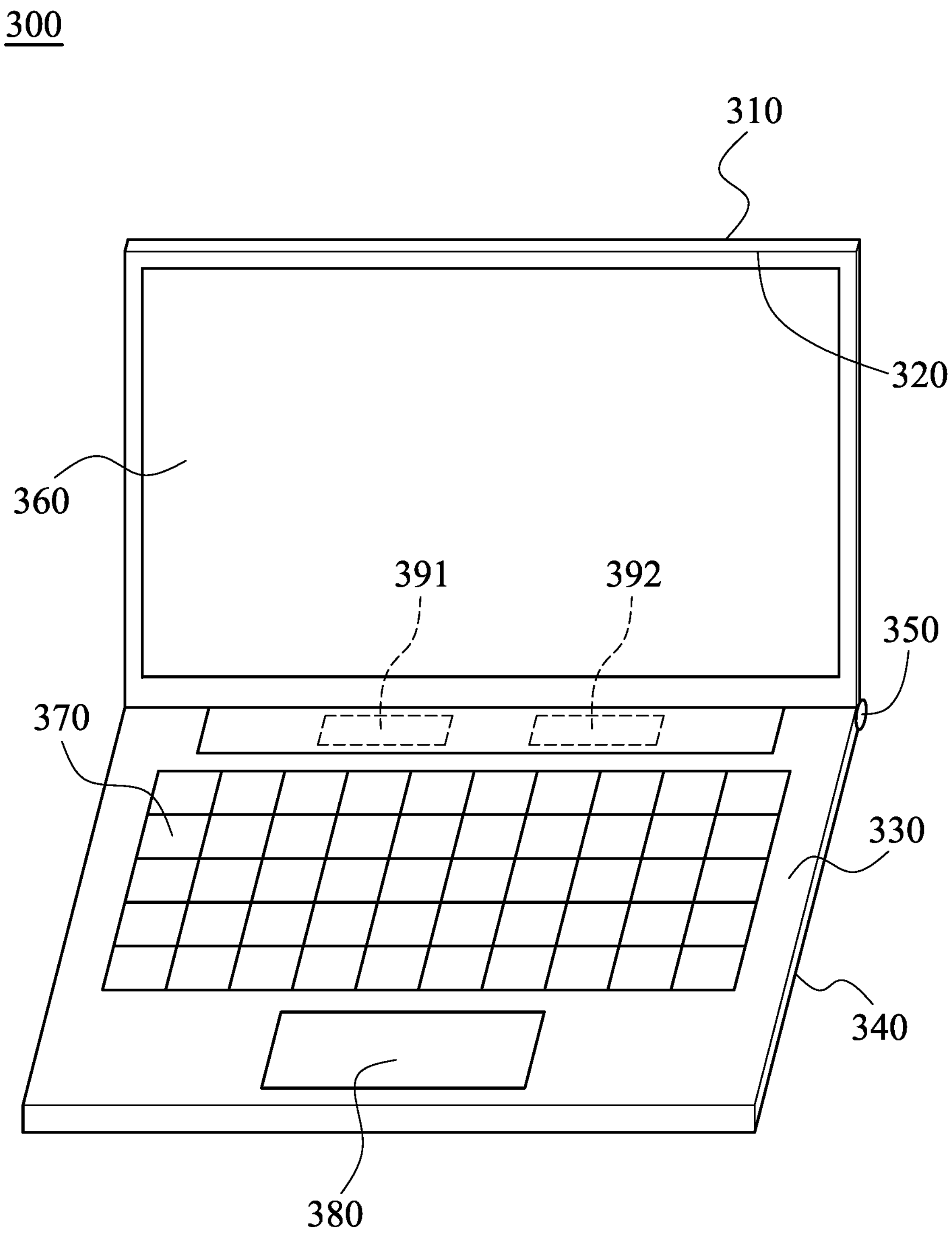
FIG. 3 is a perspective view of a mobile device according to an embodiment of the invention.

FIG. 3 is a perspective view of a mobile device 300 according to an embodiment of the invention. In the embodiment of FIG. 3, the aforementioned antenna structure 100 may be applied in the mobile device 300. The mobile device 300 may be a notebook computer, which may include an upper cover housing 310, a display frame 320, a keyboard frame 330, and a base housing 340. It should be understood that the upper cover housing 310, the display frame 320, the keyboard frame 330, and the base housing 340 are equivalent to the so-called "A-component", "B-component", "C-component" and "D-component" in the field of notebook computers, respectively. In addition, the mobile device 300 may further include a hinge element 350, a display device 360, a keyboard 370, and a touch control pad 380. The aforementioned antenna structure 100 may be disposed at a first position 391 and/or a second position 392 of the mobile device 300. The aforementioned antenna structure 100 may also be disposed between the keyboard frame 330 and the base housing 340. In addition, both of the first position 391 and the second position 392 may be adjacent to the hinge element 350 of the mobile device 300. According to practical measurements, since there is usually relatively strong noise at the first position 391 and the second position 392, the incorporation of the metal cavity 160 can prevent the radiation performance of the antenna structure 100 from being negatively affected. Furthermore, if the mobile device 300 is replaced with an external keyboard, the upper cover housing 310, the display frame 320, the hinge element 350, and the display device 360 may all be omitted.

The invention proposes a novel antenna structure and a corresponding mobile device. In comparison to the conventional design, the invention has at least the advantages of small size, wide bandwidth, high communication quality, and being operated in different environments. Therefore, the invention is suitable for application in a variety of communication devices.

Note that the above element sizes, element shapes, element parameters, and frequency ranges are not limitations of the invention. An antenna designer can fine-tune these settings or values in order to meet specific requirements. It should be understood that the antenna structure and the mobile device of the invention are not limited to the configurations depicted in FIGS. 1-3. The invention may merely include any one or more features of any one or more embodiments of FIGS. 1-3. In other words, not all of the features displayed in the figures should be implemented in the antenna structure and the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a first ground element, comprising a first edge segment, a first protruding segment, and a second protruding segment;

a second ground element, comprising a second edge segment, a third protruding segment, and a fourth protruding segment;

a first capacitor, coupled between the first protruding segment and the third protruding segment;

a second capacitor, coupled between the second protruding segment and the fourth protruding segment;

a first radiation element, having a feeding point, wherein the first radiation element is adjacent to the second edge segment;

a second radiation element, wherein the first radiation element is coupled through the second radiation element to the first edge segment; and a third radiation element, coupled to the second edge segment, wherein the third radiation element is adjacent to the second radiation element.

2. The antenna structure as claimed in claim 1, further comprising:

a metal cavity, coupled to the first edge segment and the second edge segment.

3. The antenna structure as claimed in claim 1, wherein a width of the first protruding segment is greater than that of the second protruding segment, and a width of the third protruding segment is greater than that of the fourth protruding segment.

4. The antenna structure as claimed in claim 1, wherein a capacitance of the first capacitor is from 0.2 pF to 0.7 pF.

5. The antenna structure as claimed in claim 1, wherein a capacitance of the second capacitor is from 0.2 pF to 0.7 pF.

6. The antenna structure as claimed in claim 1, wherein the first radiation element substantially has a variable-width N-shape.

7. The antenna structure as claimed in claim 1, wherein the second radiation element substantially has a variable-width L-shape.

8. The antenna structure as claimed in claim 1, wherein the second radiation element has a first corner notch and a second corner notch.

9. The antenna structure as claimed in claim 1, wherein the third radiation element substantially has a straight-line shape.

10. The antenna structure as claimed in claim 8, wherein the third radiation element at least partially extends into the second corner notch of the second radiation element.

11. The antenna structure as claimed in claim 1, wherein a first coupling gap is formed between the first radiation element and the second edge segment, and a width of the first coupling gap is shorter than or equal to 1 mm.

12. The antenna structure as claimed in claim 1, wherein a second coupling gap is formed between the third radiation element and the second radiation element, and a width of the second coupling gap is shorter than or equal to 0.5 mm.

13. The antenna structure as claimed in claim 1, wherein a third coupling gap is formed between the second radiation element and the first radiation element, and a width of the third coupling gap is from 0.5 mm to 1.5 mm.

14. The antenna structure as claimed in claim 1, wherein the first radiation element, the second radiation element, and the third radiation element are substantially surrounded by the first ground element and the second ground element.

15. The antenna structure as claimed in claim 1, wherein the antenna structure covers a first frequency band, a second frequency band, and a third frequency band.

16. The antenna structure as claimed in claim 15, wherein the first frequency band is from 2400 MHz to 2500 MHz, the second frequency band is from 5150 MHz to 5850 MHz, and the third frequency band is from 5925 MHz to 7125 MHz.

17. The antenna structure as claimed in claim 15, wherein a length of the first radiation element is shorter than 0.25 wavelength of the first frequency band.

18. The antenna structure as claimed in claim 15, wherein a length of the second radiation element is substantially equal to 0.25 wavelength of the third frequency band.

19. The antenna structure as claimed in claim 2, wherein the metal cavity substantially has a hollow cuboid shape without any cover.

20. A mobile device, comprising:

a keyboard frame;

a base housing;

a hinge element; and an antenna structure as claimed in claim 1;

wherein the antenna structure is disposed between the keyboard frame and the base housing;

wherein the antenna structure is adjacent to the hinge element.

* * * * *